Patented Sept. 2, 1930

1,774,854

UNITED STATES PATENT OFFICE

WILLIAM C. TAYLOR, OF CORNING, NEW YORK, ASSIGNOR TO CORNING GLASS WORKS, OF CORNING, NEW YORK, A CORPORATION OF NEW YORK

ULTRA-VIOLET TRANSMITTING GLASS

No Drawing.    Application filed October 15, 1927. Serial No. 226,518.

This invention relates to the art of ultra violet transmitting glasses, and more particularly to an improved glass of this type and a method of making such glasses.

It is known that ferric oxide and titanium have a marked effect in preventing ultraviolet transmission, hence it is necessary to decrease these impurities as much as possible.

The highest grades of clear glass sand contain approximately 0.025 of one per cent of titanium and 0.015 of ferric oxide and these titaniferous and ferruginous impurities are so intimately mixed with the silica that it is extremely difficult to decrease them below these figures by washing or by metallic or magnetic separation.

It has heretofore proved impossible to obtain silica from this source which has a sufficiently low content of titanium and iron salts to give a silicate glass as high in ultraviolet transmission as desired.

I have discovered, however, that by using primary quartz as the source of silica I can easily and cheaply produce silicate glasses having very high ultraviolet transmission.

It is therefore an object of this invention to produce glasses having very high ultraviolet transparency without the difficulties which have heretofore been encountered.

For the purposes of this specification primary quartz may be defined as quartz found in its original position and condition, and may consist either (1) of silica, solidified from molten magmas, such as granite, (which variety of quartz has been called vug quartz), or (2) of silica deposited from magmatic sources under relatively high temperature and pressure, but below the melting point of quartz. This type of quartz is referred to as vein quartz. Secondary quartz is quartz which has been mechanically transported and/or concentrated from its original position and condition.

Vein quartz, which is a form of primary quartz, is silica deposited by hydrothermal action as a fissure filling or as a replacement product in existing rocks, whereas quartzite and sandstones are of sedimentary origin and usually are accumulated by the action of water on the decomposition products of granites and other siliceous rocks.

Sedimentary quartz deposits contain titaniferous and ferruginous impurities that are not easily removable because intimately mixed with the silica grains whereas, in the case of primary quartz or vein quartz, because of the conditions under which it is formed, the individual silica crystals are practically free from titaniferous, ferruginous and other deleterious materials, so that when this material is crushed it is relatively easy to remove any impurities by washing.

I have found that if primary quartz or vein quartz is properly crushed so as to keep introduced foreign material to a minimum and is then treated to remove any metallic and metallic oxide impurities, as by washing with hydrochloric acid, or treating with phosgene, practically all the objectionable titaniferous and ferruginous impurities can be removed.

By the use of purified vein or primary quartz, a series of glasses which transmit approximately 87% of the radiation at 302 millimicrons in thicknesses of 2 mm. have been made. As an illustrated example of these glasses, but without limiting myself thereto, I mention the following composition:

|  | Per cent |
|---|---|
| $SiO_2$ | 75 |
| $NaO_2$ | 15 |
| $CaO$ | 4 |
| $ZnO$ | 5 |
| $Al_2O_3$ | 1 |

In the above glass, the soda, lime and zinc were especially purified materials, but to obtain transmissions of 50% or less, it is unnecessary to use purified soda, lime and zinc.

It will therefore be apparent that I have developed a simple and efficient way of making glasses which have a high ultraviolet transmission using vein quartz.

I claim:

1. The method of making ultraviolet transmitting silicate glasses which consists in melting a glass batch containing vein quartz as the source of silica.

2. The method of making ultraviolet transmitting glass which consists in melting vein quartz with other glass making ingredients, free of ultraviolet absorbing materials.

3. The method of making ultraviolet transmitting glasses which consists in crushing vein quartz, treating it to remove titaniferous and ferruginous impurities, and melting it with purified glass making materials.

4. The method of making ultraviolet transmitting glasses which consists in adding to the other constituents of the glass batch approximately 75% silica in the form of vein quartz and then fusing the batch.

5. The method of making ultraviolet transmitting silicate glasses which consists in melting a glass batch containing primary quartz as the source of silica.

6. The method of making glasses of high purity which consists in melting a glass batch containing vein quartz as a source of silica.

7. The method of making glasses of high purity, which consists in crushing vein quartz, chemically treating the crushed material to remove iron, mixing the purified material with proper batch ingredients, and melting the resultant batch.

WILLIAM C. TAYLOR.